INVENTORS
ALEX C. KEYL
MARY G. BRODIE
BY
Richard J. Lustig
ATTORNEY

INVENTORS
ALEX C. KEYL
MARY G. BRODIE
ATTORNEY

INVENTORS
ALEX C. KEYL
BY MARY G. BRODIE

Richard J. Lentig
ATTORNEY

United States Patent Office 3,511,687
Patented May 12, 1970

3,511,687
HIGH ENERGY CURING OF PHOTOPOLYM-ERIZABLE NONAIR INHIBITED POLYESTER RESIN COATINGS
Alex C. Keyl, Walnut Creek, Calif., and Mary G. Brodie, Chicago, Ill., assignors to The Sherwin-Williams Company, Cleveland, Ohio, a corporation of Ohio
Continuation-in-part of application Ser. No. 360,359, Apr. 16, 1964. This application Dec. 5, 1967, Ser. No. 701,023
Int. Cl. B44d 1/50
U.S. Cl. 117—62
11 Claims

ABSTRACT OF THE DISCLOSURE

Photopolymerizable nonair inhibited polyester resin coatings having a thickness of 2 to 12 mils (0.002 to 0.012 inch) preferably containing a photosensitizer, are cured by subjecting them to light waves within the range of 1850 to 4000 angstroms in flashes or pulses at a total input energy level of at least 50,000 watt seconds or a total output energy level of at least 30,000 watt seconds. The process is useful in forming coatings on metal, wood or other substrate but is especially valuable for producing cured resinous coatings on wood, e.g., plywood panels.

---

This application is a continuation-in-part of United States application Ser. No. 360,359 filed Apr. 16, 1964, now abandoned.

Infusible polyester resins are formed by curing a composition comprising one or more polymers of polycarboxy organic compounds and polyhydroxy organic compounds together with a monomer containing ethylenic unsaturation, usually styrene. Thus, a general type of polyester resin might be made by reacting propylene glycol, maleic anhydride, phthalic anhydride and styrene. The styrene acts as a solvent and also copolymerizes when the resin is cured. This type of polyester resin, however, is air-inhibited and is unsuitable for the practice of the present invention.

A basic deterrent to the use of polyesters in the coatings field has been the difficulty of obtaining practical cure rates at low temperatures, particularly as required in finishing wood and other heat sensitive substrates.

Catalyst systems employing peroxides with inhibitors and stabilizers to prevent premature gelling of polyester finishes have been developed in the prior art. Practical catalyst systems have been a compromise between pot life and curing time. Catalysts have been developed for curing, both at room temperature and under low temperature baking conditions.

One of the objects of the present invention is to provide a new and improved method for producing polyester resin coatings.

A further object is to provide a new and improved method for producing polyester resin coatings quickly and without excessive heating. Other objects will appear hereinafter.

In accordance with the invention it has been found that new and improved results in the coatings art can be obtained in preparing coatings having a thickness of 2 to 12 mils (0.002 to 0.012 inch) by forming such coatings from photopolymerizable nonair inhibited polyester resins, preferably containing a photosensitizer, and curing such resins by subjecting them to light waves within the range of 1850 to 4000 angstroms in flashes or pulses at a total input energy level of at least 50,000 watt seconds or a total output energy level of at least 30,000 watt seconds. The process is useful in forming coatings on metal, wood or other substrate but is especially valuable for producing cured resinous coatings on wood, e.g., plywood panels.

The resins which are effective for the purpose of this invention are all characterized by the fact that they are not inhibited by air or oxygen. They can also be described as air drying polyesters. These resins, because of their chemical composition, are capable of achieving good surface cure in the presence of air or oxygen. Examples of the chemical types involved include allyl ether resins, benzyl ether resins, tetrahydrophthalic anhydride resins, endomethylene tetrahydrophthalic anhydride resins or cyclopentadiene modified resins, and acetal resins.

The nonair inhibited polyesters employed in the practice of this invention can also be described as air drying unsaturated polyesters. Air drying unsaturated polyesters which are employed in this invention to produce polyester coatings are especially modified to prevent air inhibition of cure. One method provides for replacing a portion of the conventional reactants with reactants having allyl group containing substituents. Air drying polyesters substantially free from air inhibition are described, for example, in U.S. Pats. 3,006,878 and 2,852,487. The allylic groups are an essential component of the polyester because they serve to actively prevent the inhibiting action of atmospheric oxygen which is normally dissolved at the surface of films of polyester exposed to air. Allyl groups may be introduced into the polyester itself by employing as ingredients in the polyester formulation, allyl ether type compounds or compounds containing allyl groups without ether linkages such as tetrahydrophthalic anhydride and Nadic anhydride ($\Delta^4$ endomethylene tetrahydrophthalic anhydride).

Allyl ethers useful in the preparation of unsaturated polyesters for the purpose of incorporating allyl substituent groups in the polyester molecule include monohydric and/or polyhydric ether derivatives of polyhydric alcohols and allyl glycidyl ether. These compounds may be substituted for from 5 to 50% of the glycol equivalents in an unsaturated polyester formulation depending to a certain extent upon the number of allyl groups per mole of the particular allyl ether(s) used.

The dicarboxylic acid component of this type of formulation may be characterized by a maximum ratio of unsaturated to saturated acid of 95 to 5 and a minimum ratio of 10 to 90 with a preferred range of between 75 to 25 and 25 to 75, respectively. The strongest cured films are obtained when the unsaturated acid content is greater than 50% of the total dicarboxylic acid component of the polyester.

In formulating unsaturated polyesters for present purposes, it is preferred to employ polyester resins containing allyl groups, however, compounds which do not contain ether linkages may be used to introduce allylic groups into the polyester molecule.

Among compounds useful in polyester structures which do not contain ether linkages are tetrahydrophthalic anhydride and endomethylene tetrahydrophthalic anhydride (Nadic).

Dicarboxylic acids illustrative of those often used in preparing unsaturated polyesters suitable for the purposes of this invention include maleic acid, fumaric acid, maleic anhydride, etc. Though maleic anhydride is, perhaps, preferred, other dicarboxylic acids substituted therefor in whole or in part include itaconic acid, citraconic acid, mesaconic acid, aconitic acid and the other less common dicarboxylic acids as mentioned in the polyester art.

Other dicarboxylic acids can be used in partial replacement for the unsaturated class described above, and included are phthalic anhydride, phthalic acid, Nadic anhydride, tetrahydrophthalic anhydride, adipic acid, azelaic acid, etc.

Aromatic dicarboxylic acids and those of even greater acid functionality (mellitic anhydride), though containing double bonds in the nucleus, do not undergo addition reactions as do the preferred class of dicarboxylic acids (fumaric). From the above and the state of the art, it is clear that mixtures of polyfunctional acids or their anhydrides are often employed to produce unsaturated polyester resins, and these modifications are generally useful for our purposes.

Ethylene glycol and diethylene glycol are most often selected as primary reactants with the foregoing polyfunctional acids to form useful polyesters. Obviously, however, other dihydric alcohols and polyhydric alcohols of greater functionality are known to be useful.

When polyfunctional modifiers are employed, illustratively, pentaerythritol, malic acid, etc., they may constitute from 5 to 12% of the total equivalents present in the polyester. The use of a polyfunctional modifier influences the ratio of acids chosen. For example, where pentaerythritol has been used as the polyfunctional modifier, the preferred acid ratio is often at about equal parts of fumaric acid and tetrahydrophthalic anhydride.

Esterification of the alcohol components present in the reactive mixture in the formation of unsaturated polyesters is carried out in the conventional manner at a temperature of from about 350° to 450° F. to an acid value of from 5 to 50. To compensate for loss of polyhydric alcohol component during processing, a small molar excess over theory of hydroxyl equivalents is included initially in the reaction at the rate of from 5 to 20 percent excess over stoichiometric hydroxyl equivalents. After the desired acid value has been reached, the mass is allowed to cool to a temperature at which it may safely be dissolved in styrene and/or other ethylenically unsaturated monomer(s). Compounds containing allyl ether groups may also be included at this point as part of the polyester solvent. The reduction of the polyester with monomer is often to the extent that the monomer constitutes from 20 to 50 percent by weight of the thinned polyester product. Ethylenically unsaturated monomers other than styrene may be used in the practice of this invention. Most frequently used are monomers containing reactive vinyl groups including vinyl toluene, dibutyl fumarate, diethyl maleate, 2-ethyl hexyl acrylate, diallyl phthalate, diallyl maleate, methyl methacrylate, acrylonitrile, vinyl pyrrolidone, divinyl spirobi, triallyl citrate, ethylene glycol dimethacrylate, etc.

The following are examples of preferred constituents for providing reactive sites in the polymer: trimethylolpropane diallyl ether; trimethylolpropane monoallyl ether; diallyl pentaerythritol; allyl glycidyl ether; allyl glycerol ether; allyloxy propano; benzyl ethers; triethylene glycol or higher homologues; tetrahydrofurfuryl alcohol; dioxane; acetal made from 1,2,6-hexanetriol and formaldehyde, 2-vinyl 1,3-dioxolane (hexanetriol and acrolein) and diallylidene pentaerythritol; dicyclopentyl ethers; endomethylene tetrahydrophthalic anhydride; TCD Alcohol E[8-oxytricyclodecene-4-(5,2,1,0$^{2,6}$)]; TCD Alcohol DM[tricyclodecan(5,2,1,0$^{2,6}$) dimethylol]; tetrahydrophthalic anhydride.

Conventional catalyst systems are for the most part inoperable to cure polyester resins at low temperatures because it is impossible to obtain a cure at room temperature. Catalysts most frequently used to effect the heat conversion of unsaturated polyester resins consist mainly of peroxide initiators. Peroxide initiators include benzoyl peroxide; 2,4-dichlorobenzoyl peroxide; methyl ethyl ketone peroxide; cyclohexanone peroxide; cumene hydroperoxide; bis(para-bromobenzoyl) peroxide; bis-(phthalyl) peroxide; bis(acetyl) peroxide; tertiary-butyl hydroperoxide; ethyl peroxydicarbonate; di-isopropylene ozonide; peracetic acid, etc.

Other additives may be and normally are included with the initiator to increase pot life of unsaturated polyesters by inhibiting polymerization. One class of agents called Retardants accomplish this end by inhibiting or suppressing free-radical formation. Illustrative of such Retardants are hydroquinone, phenols, aromatic amines and antioxidants such as alpha-naphthol; resorcinol and sulfur compounds. A second class of agents, illustratively quinones and salts of substituted hydrazines, often referred to as Stabilizers are preferred over Retardants because the later increase the pot life of the resin at room temperature but lose their retardant quality at elevated temperatures.

Special low temperature catalytic systems have been developed to cure polyester resins but their use necessarily results in polyesters having a short pot life, a deterrent factor in their commercial use. For low temperature curing, unsaturated polyester formulations usually employ, in addition to the aforementioned ingredients, a component which activates the peroxide initiator and promotes faster cure than would otherwise rsult at low temperature. Examples of activators used for this purpose include metallic driers, illustratively—cobalt naphthtenate, oxides and hydroxides of barium, strontium, magnesium and calcium; phosphines; triethanolamine and isopropanolamine, dimethylaniline, etc.

In the practice of this invention it is preferable to use a photosensitizer. Catalytic agents which increase the photosensitivity of polyesters are known. A photosensitizer of polymerization or photopolymerization catalyst absorbs light and with the energy so acquired dissociates into free radicals. Liberated free radicals have sufficient energy to initiate polymerization. Early photosensitizers were mercury in copolymerizing ethylene and butadiene; cadmium, ammonia, and uranium salts to polymerize ethylene; triethyl lead acetate, iron and chromium and aluminum salts to promote polymerization of liquid monomers. Benzoyl peroxide, acetone, chloral hydrate and certain dyestuffs including azo compounds have been found effective to induce photopolymerization. Carbonyl compounds, including benzophenone and benzaldehyde, are reported to be active. Acyloins and organic compounds having a vicinal carbonyl group have been reported as active. Acyloin ethers have been reported as being more active than acyloins. Allyl hydroperoxide is said to be commercially feasible for such end use. Organic compounds having two or more halogens on the same carbon atom, hexachloroethanes, alkyl iodides in the presence of mercury and 2-position substituted naphthalenes, 2,7-dichloro-diphenylene sulfone, aryl and alkyl disulfides are reported photoactive, the aryl class said to possess higher activity.

Patents disclosing specific photochemically active catalysts include U.S. 2,236,736, 2,505,067, 2,505,068, 2,548,-685, 2,579,095, 2,754,210, 2,809,182, 2,809,183, 2,951,758 and 3,326,710. The foregoing prior art is incorporated herein to the same extent as though it were set out in full.

It is preferably to use as a photosensitizer a mixture of 2-naphthalene sulfonyl chloride and 1-chloromethvl naphthalene as disclosed in U.S. Pat. 3,326,710.

The quantity of photosensitizer used depends on the type of resin but is preferably a minimum of 0.1% by weight of the resin and usually does not exceed 5% by weight. A preferred range is 0.6 to 2%.

To evaluate the invention two different light units were used initially. Light unit No. 1 was a 3000 volt unit that flashed every 30 seconds. Light unit No. 2 was a 1000 volt unit of five lamps, where a lamp flashed every other second. The input in watt seconds per flash multiplied by the number of flashes gives the total watt seconds, which is a measure of the total energy required for cure. This was determined empirically to be a minimum of 50,000 watt seconds. Since the efficiency is at least 60%, the minimum total in terms of output would be at least 30,000 watt seconds. In most cases the input energy for cure preferably is at least 100,000 watt seconds.

The resin coating composition was applied to wooden panels by conventional methods (e.g., spraying or roller coating) in a thickness of 2 to 6 mils. With Unit No. 1 an active ground coat was used. With Unit No. 2 at the higher energy levels cure was possible both with and without an active ground coat and with and without infrared treatment.

Unit No. 2 is described in the drawings in which.

Figure 1:
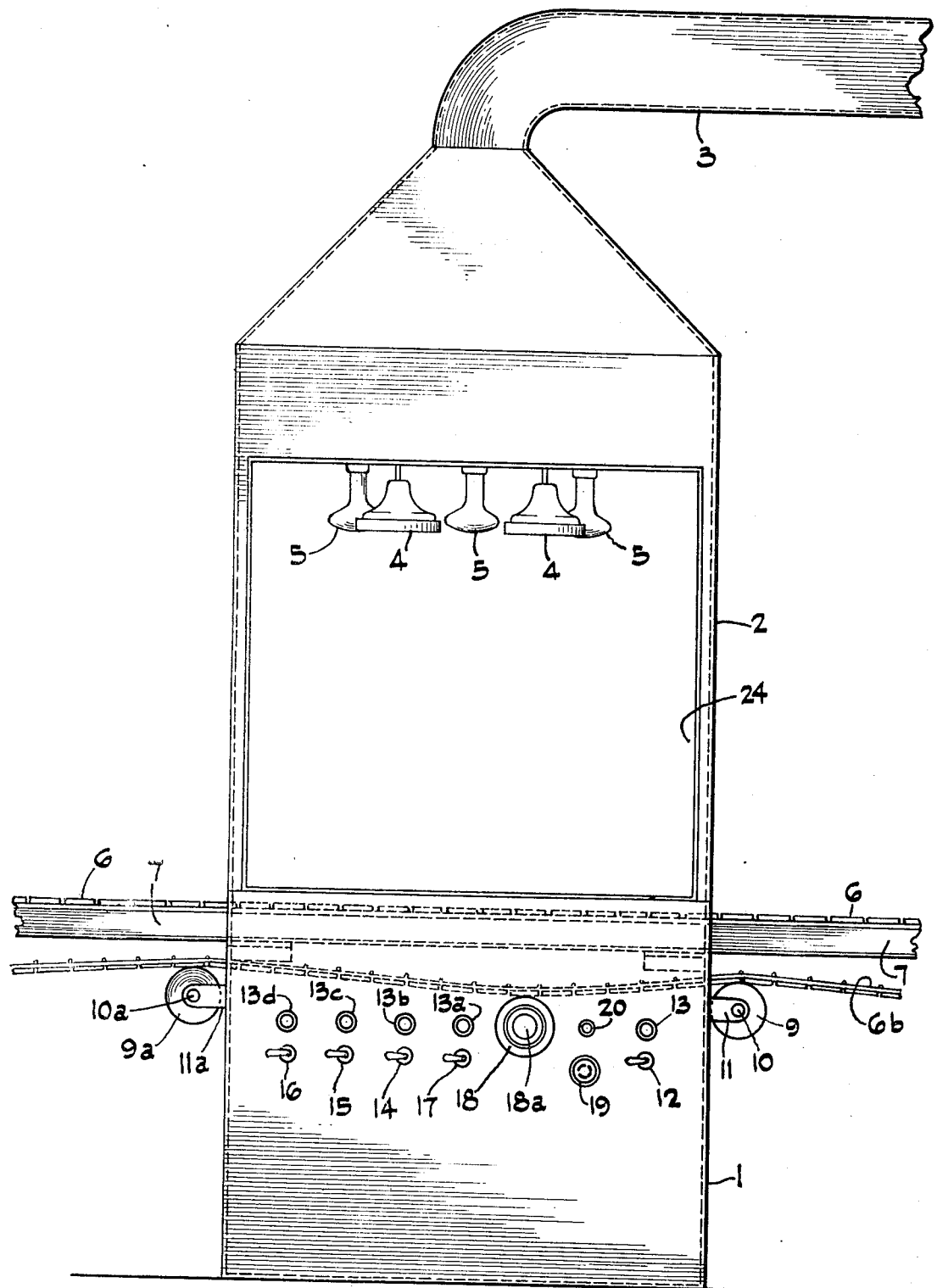
FIG. 1 is a front view of one embodiment of the invention in final assembly, parts having been removed.
Figures 2, 3:
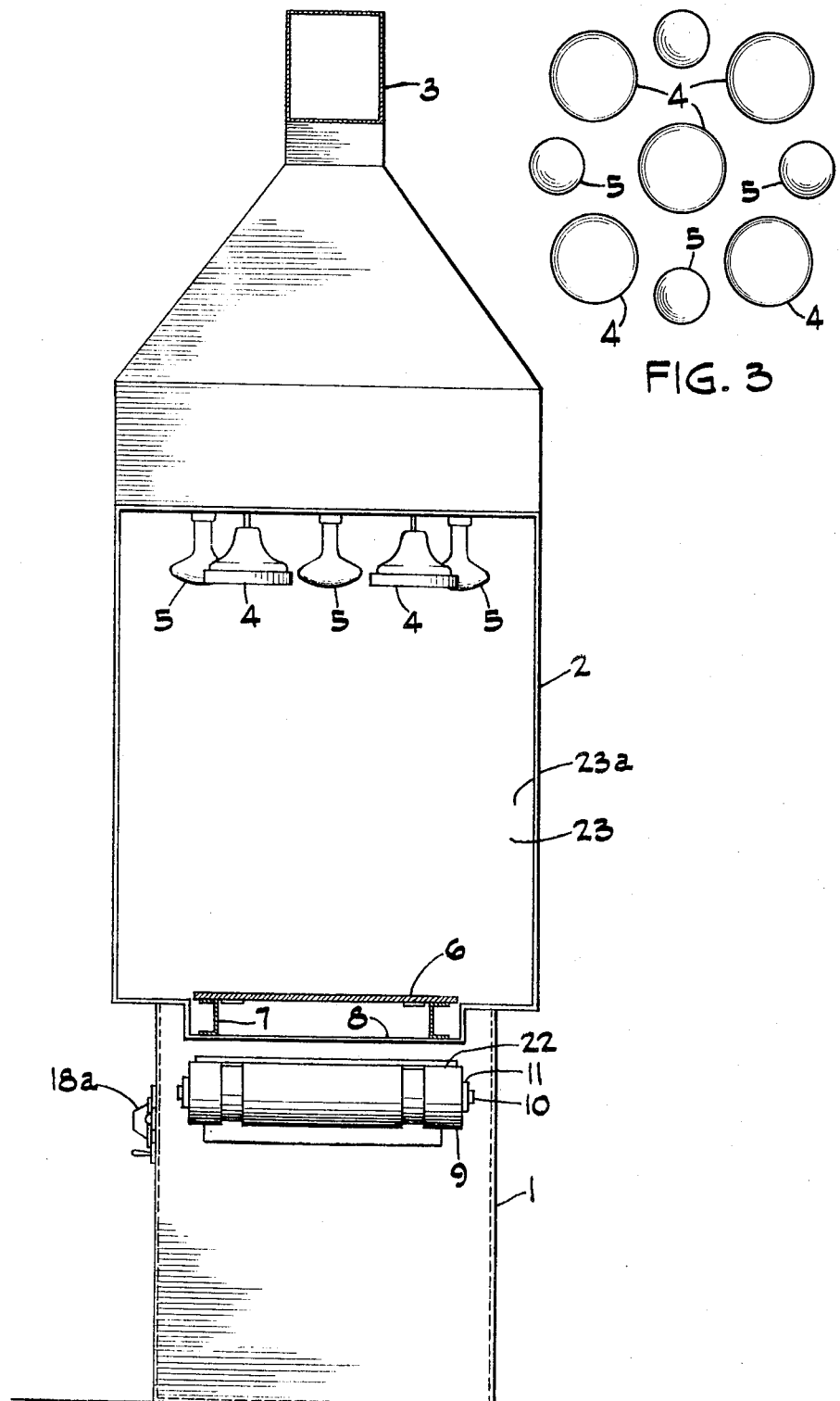
FIG. 2 is a side view of the assembled embodiment of FIG. 1, certain parts being in section.
Figure 4:
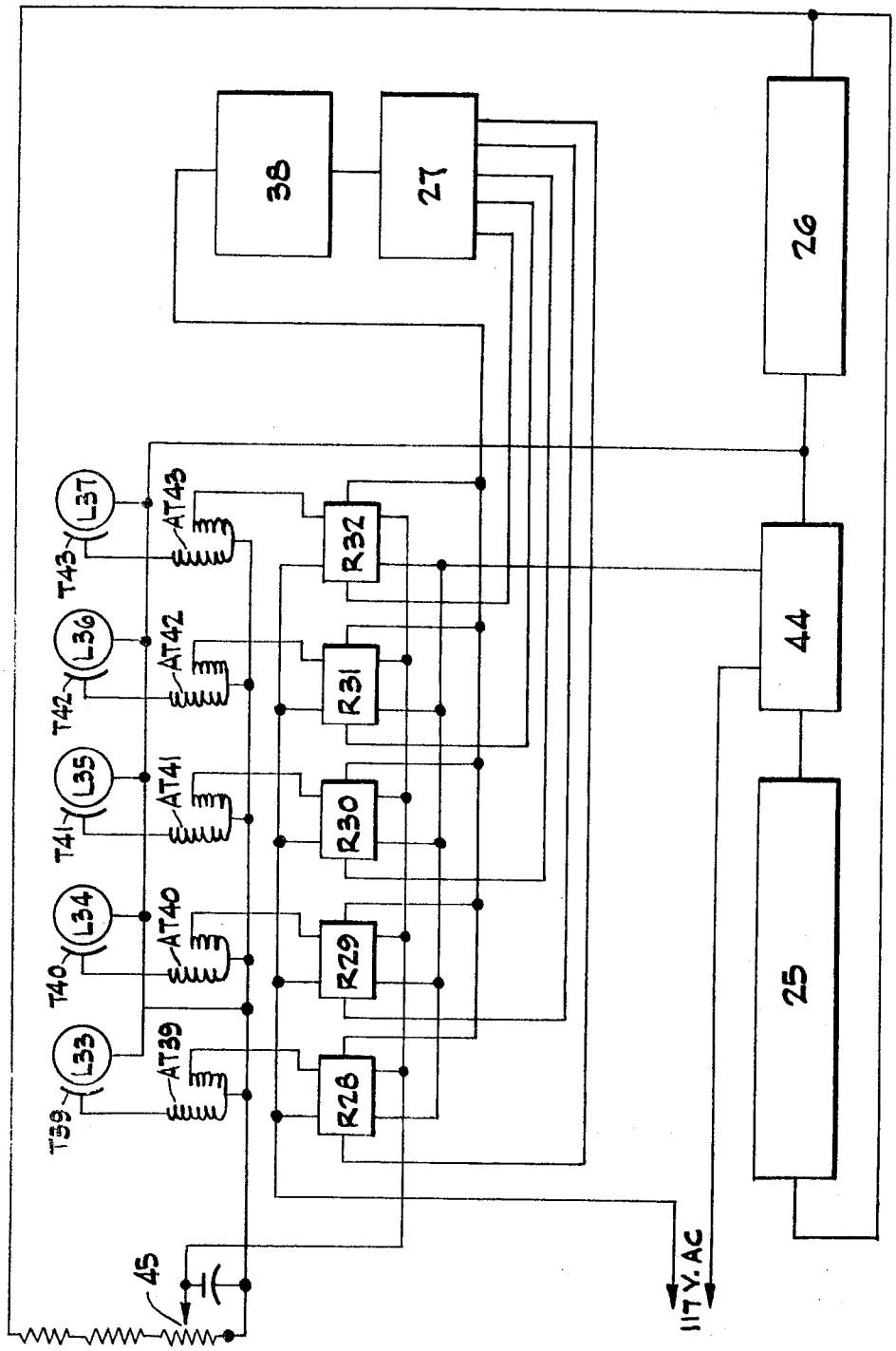
Figure 5:
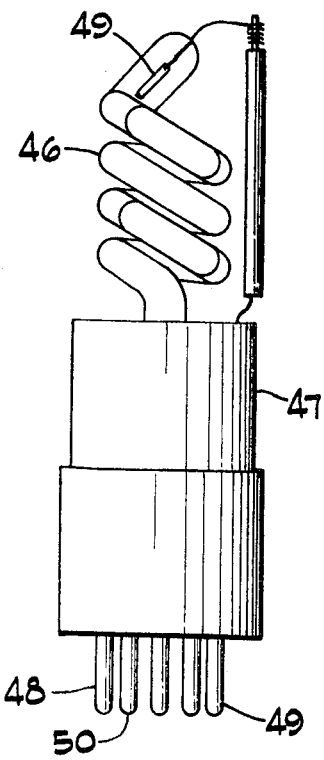
Figure 6:
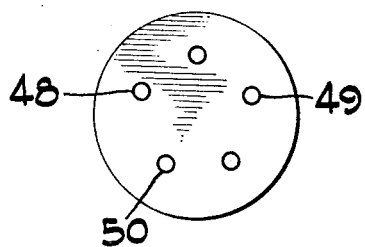

FIG. 3 diagrams the relative position of infrared lamps and flash lamps in the embodiment of the invention as shown in FIG. 1;

FIG. 4 is a schematic electrical diagram of a bank of five flash lamps as shown in FIG. 1;

FIG. 5 is a side view of a xenon-filled quartz helix flash lamp as shown in the embodiment of FIG. 1; and FIG. 6 is a bottom view of FIG. 5.

Referring more particularly to the drawings: In FIG. 1 a rectangular cabinet 1 provides a base for hood 2 which is fitted with exhaust stack 3 for removal of solvent vapors. A bank of five flash lamps in reflectors 4 and four infrared lamps 5 are mounted in upper portion of hood 2, downwardly directed so that light radiation emanating from the lamps is focused upon conveyor 6 directly below the lamps. Conveyor 6 travels on a pair of parallel rails 7 which are mounted flush with the floor of base cabinet 1 within the recess 8 of cabinet 2.

The conveyor is driven by suitable means to provide that coated materials flow smoothly through the unit with sufficient dwell time under the light radiation zone to insure substantial cure of the polyester coatings.

The embodiment of the invention shown in FIG. 1 is a pilot plant unit utilizing five flash tubes. A larger flash unit or a number of smaller units combined is contemplated in commercial production units to cure polyester coatings at high production levels. Longer residence time under light radiation zones obtained by utilizing a greater number of flash tubes permits greater conveyor speeds.

Although not shown in the drawings of the present embodiment, the invention in its preferred embodiment comprises a conveyor for moving articles through the zones in which coating and curing operations are performed; a coating device located along the conveyor, illustratively, curtain coater, roller coater, etc.; a bank of infrared lamps in line therewith to provide a zone of heat induction followed by a plurality of flash tube lamps arranged in a bank(s) under which the final curing operation is performed.

Returning to FIG. 1, the lower segment 6b of conveyor 6 is supported by rollers 9 and 9a, rotably supported at their ends by brackets 11 and 11a on shafts 10 and 10a respectively. Brackets 11 and 11a are mounted on the sides of base cabinet 1 adjacent to slots 22 which allow conveyor 6 to pass through lower cabinet 1 as shown in FIG. 2.

Both sides of hood 2 are provided with large openings 23 and 23a for passage of conveyor 6 and the coated articles transported thereon. Any portion of openings 23 and 23a above that needed for passage are preferably covered by removable panels or other means to block light escape. The light flashes produced by the flash tubes are too intense for human eyes and therefore must be shielded as much as possible. In FIG. 1, a large opening 24 in the front panel of hood 2 is fitted with sliding doors for ingress and egress to the hooded area. The front panel of base cabinet 1 is a control panel containing switches and controls necessary to operate the unit.

The circuitry of the photolysis unit is contained in the interior of the base cabinet. Switch 12 is the main switch controlling the power for the entire photolysis unit. Indicator lights 13 to 13d are positioned above each switch signaling when the switch is in the "on" position. Switch 14 controls power to the infrared lamps; switch 15 controls the conveyor drive and switch 16 activates the flash tubes. Switch 17 is available as a spare. The photolysis unit is connected to an interior 117 volt power source by means of three pronged safety socket 19 disconnecting when the unit is disassembled, and an exterior cable fitted at the end with a female plug which is inserted into socket 19 and locked into position by twisting.

A diagram of the five flash tubes with reflectors and four infrared lamps as they are arranged in the photolysis unit is shown in FIG. 3. Infrared lamps 5 are represented by small circles and flash tube unit 4 by large circles.

Infrared lamps 5 are connected in parallel with respect to the 117 volt power source. A variable transformer 18 mounted in the control panel as shown in FIG. 1 controls the voltage to the lamps and is adjustable by means of knob 18a to control the infrared heat output of the lamps from zero to rated output or 375 watts for each lamp. By means of the five infrared lamps the ambient temperature of ware on the conveyor 6 under lamps 5 may be controlled from about 75° F. (room) temperature to 300° F.

Referring to schematic diagram FIG. 4 of the electrical circuit operating the five flash tubes 4: Power supply 25 increases the 117 volt line voltage to approximately 1000 volts, rectifying the AC source to direct current of approximately 950 volts. This voltage is impressed across a bank of storage capacitors 26 consisting of five pairs of capacitors, each pair having a total capacitance of 225 mfd. The storage capacity of the circuit may be changed by connecting one or more capacitors in parallel in the capacitor bank 26 of the circuit.

With one pair of capacitors connected in the circuit 225 mfd. or 112 watt/seconds are available. Capacitance of the unit may be increased by connecting additional ones of the remaining four pairs of condensers into the circuit until a maximum large capacity of about 560 watt/seconds is obtained.

The voltage stored in capacitors 26 is impressed across the bank of flash tubes L33 to L37, but is discharged through but one of the tubes at a time as directed by a sequential switching circuit consisting of sequential timer 27 and five relays R28 to R32. Sequential operation is governed by timer 27. Power for the sequential switching circuit is furnished by rectifier 38, which converts 117 volt alternating line current to direct current. Relays R28 to R32 are closed for an instant, one at a time, in repeating sequence by timer 27. With the closing of the contacts of one of the five relays R28, for example, relay 44 is activated disconnecting capacitor bank 26 from power supply 25; the capacitor voltage remaining connected across flash tubes L33 to L37. Simultaneously, a portion of this voltage is taken off at 45 through closed relay R28 and through the trigger coil AT 39 connected thereto. A high voltage pulse thus induced in the trigger AT 39 ionizes the gas in flash tube L33, causing a conductive ionized path into which the storage capacitor bank 26 discharges its energy causing a brilliant flash of light.

Each tube is likewise flashed in turn in repeating sequence. In the unit illustrated, one flash per second can be produced. At this rate the five arc light flash tubes L33 to L37 are flashed one at a time with each tube flashing once every five seconds or twelve times per minute. Flash duration may be varied between about 0.7 to 1.3 milliseconds depending upon the capacitance.

The type of flash tube employed in the photolysis unit can be best understood by referring to FIG. 5. A xenon gas filled helical closed quartz tube containing an anode 48 and a cathode 49 within opposite ends of the tube is mounted upright on base 47. Leads from the anode 48, cathode 29 and trigger 50 are connected to correspondingly numbered connecting pins mounted on the bottom of base 47 and by means of which these electrical components of the flash tube assembly are plugged into the flash tube circuit.

FIG. 6 is a bottom view of base 47 showing the location of connecting pins 48, 49 and 50.

An electrical pulse received by the trigger 50 ionizes gas within the xenon filled tube 46 creates a low resistance path across the anode 48 and cathode 49. The electrical stress caused by discharging a high potential across the electrodes within the tube forces electrons from their orbits in the inert gas atoms. Almost instantly electrons rush in to fill the orbital voids and in the process energy is radiated in the form of bursts of light.

Lumen output is a measure of the total light output generated by a light source and does include energy in wavelengths emitted outside the visible band in the electromagnetic spectrum extending from 3800 to 7600 Angstroms. Wavelengths which are most useful for present purposes lie within the ultraviolet and those wavelengths which are shorter than the visible and lie within the middle and near ultraviolet regions of the electromagnetic spectrum between about 2800 and 3800 Angstroms. It is the intensity of the burst of light radiation containing a minor amount of this photochemically active radiation emanating from inert gas filled electronic flash tube(s) employed in this invention, relatively cool as received, which produces faster cures of unsaturated polyester coatings than heretofore obtainable with other light sources. The term "flash photolysis" as used herein describes the use of electronic flash tube light sources, particularly for the express purpose of curing unsaturated polyester coating films by exposing them to intense bursts of light radiation of the output range indicated emanating from such electronic flash tubes.

The intensity of the light source is of major importance for present purposes. The flash tube light source employed herein is compared with other available light sources in the table which follows. Such data is readily available but is set out in Table I to avoid referral to a number of sources of information. Listed is the input and output data for a typical lamp in the low, middle and high power range for each class of lamp listed. From the order of magnitude, one observes that a flash tube produces light energy of a different order of intensity than prior art light sources.

tube. Because the mercury vapor in the tube is under high pressure, visible light is produced directly. This is contrasted with fluorescent lamps which are low pressure mercury lamps, the low vapor pressure causing the arc to radiate most of its energy in the ultraviolet region. The largest mercury lamp available commercially operates at 3000 watts input and generates $1.32 \times 10^5$ lumens during initial operation with a mean lumen output of $1.08 \times 10^5$ over rated life.

Unsaturated polyester resin films are most effectively cured by sources of light radiation when placed within the zone of greatest influence of said light source. The flash lamp should be focused as nearly as possible on the nonair inhibited polyester coating film with light rays impinging at right angles to the surface of the film. Light density is increased and therefore curing time is decreased by moving close to the flash tube light source. Operating distances between the various flash lamps and the surface of articles coated with unsaturated polyester coatings employed in the embodiment of the invention hereinafter shown in the drawings is from 2 to 25 inches with a preferred distance of 4–12 inches.

Air-drying unsaturated polyester resins deposited as films on wood or pressed wood fibre board, etc., tend to form air bubbles and cure is inhibited. Primers provide a preferred method of overcoming these latent defects. Primers of the lacquer type are preferred because they dry principally by solvent evaporation and are particularly adaptable to fast production schedules. Slower drying primers may be used; illustratively those containing drying oils which dry by oxidation, so long as they effectively seal and separate the substrate from the polyester coating. Primers may either be clear or pigmented, active or nonactive.

In the preferred practice of this invention, a primer is employed usually of the lacquer class containing a resin or binder which dries by solvent evaporation. Nitrocellulose and solvent solutions of the vinyl polymer class (Vinylite VAGH) in solution are used as the binder phase. These primers sometimes contain an organic peroxide, for example, methyl ethyl ketone peroxides, cyclo-

TABLE I

| Electronic Flashtube | | | | Incandescent Lamp | | Fluorescent Lamp | | Mercury Lamp | |
|---|---|---|---|---|---|---|---|---|---|
| Typical Input, Watt-Sec. | | Peak Lumen Output | | Input Watts | Output Lumens | Input Watts | Output Lumens | Input Watts | Output Lumens |
| Maximum | Minimum | Maximum | Minimum | | | | | | |
| 106 | 10 | $4 \times 10^6$ | $10^6$ | 15 | 142 | 4 | 113 | 85 | 3,000 |
| 500 | 50 | $45 \times 10^6$ | $15 \times 10^6$ | 1,500 | 33,000 | 100 | 5,200 | 1,500 | 81,000 |
| 24,000 | 800 | $300 \times 10^6$ | $170 \times 10^6$ | 10,000 | 333,000 | 215 | 15,000 | 3,000 | 132,000 |

Modern incandescent lamps generate light by means of a glowing tungsten coiled filament. Among the most powerful incandescent lamps available commercially are spotlight lamps which are rated at 10,000 watts input and operate at at a potential of 120 volts. These lamps have an output of $33 \times 10^5$ lumens measured during their initial period of operation. Characteristically incandescent lamps lose efficiency during use.

Fluorescent lamps are arc type lamps which produce light by means of a fluorescent material acted upon by radiant energy such as ultraviolet or X-rays. The fluorescent material is coated on the inside of a sealed glass bulb, usually tubular in shape and the source of radiant energy to act upon the fluorescent material is an electric arc which passes through mercury vapor within the gas filled coated bulb. Commercial fluorescent lamps are available up to 215 watts input with a rated output of $5.2 \times 10^3$ initial lumens. Lumen output decreases at 40% of rated lamp life.

Mercury vapor lamps produce light by means of an electric arc passing through mercury vapor in a sealed hexanone peroxide, etc. When so formulated, the primers are referred to herein as "active ground coats." From 1% to about 9% of organic peroxide by weight of the primer are used in active ground coat formulations.

After the nonair inhibited polyester coating has been applied over a wood or other heat sensitive substrate primed with an active ground coat, preliminary low heat treatment is effective to reduce the amount of light radiation required for final curing of the film. Heat treatment promotes the escape of entrapped air, and solvents, and may initiate decomposition of peroxide catalyst. Temperatures of from 140° to 250° F. applied over a period of from 5 to 15 minutes provide sufficient preliminary heat treatment yet is not injurious to heat sensitive substrates. Low level heat treatment may be applied either before, during, or both before and during, but preferably before, flash photolysis by baking or under infrared heat radiation from infrared lamps. In the embodiment of the invention hereinbefore described and shown in the drawings, the infrared lamps and flash tubes are confined in one unit to provide a more compact unit.

The use of heat and active ground coats for curing polyester coatings is old in the art and not considered novel apart from combination with high intensity flash lamp treatment. The invention is directed to the use of intense intermittent light radiation as described for curing nonair inhibited polyester coatings and is capable of causing completely cured polyester films upon exposure of the order of seconds to full flash intensity of total light exposure. Active ground coats and low level heat treatment as described and exemplified herein are not alone capable of curing polyester coatings catalyzed for light sensitivity. However, they are used in combination with light radiation to reduce the number of light flashes and total light radiation time required to obtain completely cured polyester coatings. Example IV which follows, particularly exemplifies and illustrates various factors which affect curing rate under light radiation, e.g., the presence of an active ground coat; the use of an induction period prior to light radiation at elevated temperature and/or room temperature; and the intensity and length of exposure to light radiation.

The following examples illustrate the curing of photopolymerizable polyester coatings according to the principles of this invention. The polyester resins and photosensitizers employed are to be construed as illustrative but not as limitations.

EXAMPLE I

Preparation of 30% diallyl P.E. (pentaerythritol) diethylene maleate phthalate

|  | Weights gm. |
|---|---|
| (I) Maleic anhydride | 441 |
| (II) Phthalic anhydride | 222 |
| (III) Diethylene glycol | 490 |
| (IV) Diallyl P.E. | 428 |
| (V) Sulfonated styrene-divinyl benzene polymer (Dowex 50) | 14.6 |
| Total charge | 1595.6 |

Ingredients I, II and III were charged to a 3 liter flask fitted with a water cooled condenser and separatory trap and heated gradually to 360° F. with agitation. 86 grams of toluene were added for refluxing and a light nitrogen blanket was introduced and maintained throughout the reaction. The temperature was held at 360° F. After the acid value had dropped to 141–142, ingredients IV and V were added. The batch was reheated to 360° F. and held for a final acid value of 37–39. At a late stage in the reaction the azeotrope solvent (toluene) was removed by blowing with nitrogen. At an acid value of 37–39, the polyester resin was cooled and reduced with styrene to produce a final solution of 75% resin and 25% styrene. The final resin had an acid value of 38.6 and a viscosity of W–. Tertiary butyl hydroquinone was added as inhibitor at a concentration of 100 parts per million based on the weight of the total solution.

EXAMPLE II

Preparation of 30% diallyl P.E. ethylene maleate phthalate

|  | Weights gm. |
|---|---|
| (I) Maleic anhydride | 441 |
| (II) Phthalic anhydride | 222 |
| (III) Ethylene glycol | 285 |
| (IV) Diallyl P.E. | 428 |
| (V) Sulfonated styrene-divinylbenzene polymer (Dowex 50) | 12.7 |
| Total charge | 1388.7 |

This resin was prepared in the same manner as Example I except that the addition of IV and V was made at an acid value of 173–176. The completed resin was reduced with styrene to produce a resin solution containing 25% styrene and 75% polyester resin. The final resin solution had a viscosity of $Z_1^+$ and an acid value of 37.4. Inhibitor was added as in Example I.

EXAMPLE III

Preparation of TMP (trimethylolpropane) monoallyl ether diethylene maleate phthalate

|  | Weights gm. |
|---|---|
| (I) Maleic anhydride | 588 |
| (II) Phthalic anhydride | 296 |
| (III) Diethylene glycol | 746 |
| (IV) TMP Monoallyl ether | 306 |
| Total charge | 1936 |

Ingredients I, II and III were charged to a 3 liter flask fitted with a water cooled condenser and separatory trap and heated gradually to 360° F. with agitation. 67 grams of toluene was added for refluxing and a light nitrogen blanket was introduced and maintained throughout the reaction. The batch was held at 360° F. for an acid value of 100 and the addition of ingredient IV. Upon the addition of IV, the batch was reheated to 360°–392° F. and refluxing continued until in the late stage of the reaction the azeotropic solvent (toluene) was removed by blowing with nitrogen, Temperatures of 360°–392° F. were held for a final acid value of 20–22. The completed resin was reduced with styrene (with inhibitor added) in the same proportions as in the previous examples. The reduced resin had a viscosity of $Z_1$ and an acid value of 21.2.

EXAMPLE IV

A liquid unsaturated polyester coating compositions was prepared by blending the ingredients listed below:

|  | Weights gm. |
|---|---|
| Polyester prepared according to Example II | 100 |
| Styrene monomer | 40 |
| Silicone solution [1] | 2 |
| Non-drying capric acid alkyd | 2 |
| 1-chloromethyl naphthalene | 1.4 |
| 2-naphthalene sulfonyl chloride | 1.4 |
| Total | 146.8 |

[1] 1% silicone oil (linde R–12) reduced in styrene monomer.

The above polyester blend was flow coated onto several wooden (maple) panels primed with a primer or active ground coat as shown in Table II. After coating with polyester, the panels were aged at room temperature (or heat treated) prior to light irradiation with Unit No. 1 as shown in the table. The distance between the panels and the helical quartz flash tube during light irradiation was measured at 10 inches.

A capacitance of 350 microfarads connected to a 3,000 volt power source was used to operate the flash tube at a power input of approximately 1,600 watt seconds per flash. Duration of each flash was of the order of 2 milliseconds and the off time between flashes was from 25 to 30 seconds. Ambient temperature under the flash tube was 84° F.

TABLE II

| Panel No. | Primer | Pre-Treatment | Flashes | Results |
|---|---|---|---|---|
| A₁ | Active ground coat [1] | Aged 4 min. at room temp. heat treatment for 3-4 min. at 201° F. | 20 flashes or about 0.04 sec. light exposure. | Slightly tacky but fairly hard film. |
| A₂ | do | Heat treatment 7 min. at 195° F. and aged 3 min. at room temp. | 40 flashes or about 0.08 sec. light exposure. | Film harder than A₁. Very little tack. |
| A₃ | Primer [2] | Heat treatment 5-6 min. at 200° F. | 20 flashes or about 0.04 sec. light exposure. | Surface skin formed. Film not cured underneath. |
| A₄ | Active ground coat | Aged 19 min. at room temp. | do | Surface cure. Film gel-like and soft. |

See the following footnotes:

| | Percent |
|---|---|
| [1] 60% solution of methyl ethyl ketone peroxide in dimethyl phthalate (Lupersol DDM) | 6.5 |
| Vinyl chloride-vinyl acetate copolymer (vinylite VAGN) | 13.2 |
| Solvent: Xylene / Methyl isobutyl ketone / Ethyl amyl ketone | 80.3 |
| Total | 100.0 |

| | Percent |
|---|---|
| [2] Vinylite VAGH | 15.0 |
| Solvent: Xylene / Methyl isobutyl ketone | 85.0 |
| Total | 100.0 |

The various panels listed in Table II which were subjected to heat treatment did not evidence any cure until exposure to light radiation. As shown in Table II, light radiation alone was effective to partially cure the untreated panel, A₄, at low temperature (approximately 84° F.) but additional light flashes would have been necessary to obtain a complete cure. Panel A₁ illustrates that a more complete cure may be obtained with equivalent light flashes by employing an active ground coat plus heat treatment. As shown by Panel A₂, a minimum of 40 flashes was required for effective cure. At an energy output per flash of 1575 watt seconds the total energy used was 63,000 watt seconds. Heat treatment alone without the use of an active ground coat, is not effective as shown by the panel A₃ data. In addition, data contained in Table II illustrates the effect of increased light exposure upon the cure of polyester coatings by flash photolysis.

EXAMPLE V

| | Weights gm. |
|---|---|
| Polyester prepared according to Example I | 67.00 |
| Polyester prepared according to Example II | 33.00 |
| Styrene monomer | 35.00 |
| Silicone solution | 2.00 |
| Non-drying capric acid alkyd | 2.00 |
| 1-chloromethyl naphthalene | 2.03 |
| 2-naphthalene sulfonyl chloride | 2.03 |
| Total | 143.06 |

1% silicone oil (Linde R-12) reduced in styrene monomer.

The above ingredients were thoroughly mixed to obtain a liquid polyester coating. A wet film of the coating thus prepared was deposited on a wooden panel which had been primed with an active ground coat as in Example IV. Pre-treatment of the coated panel consisted of baking in an oven for five minutes at 212° F. Thereafter the panel was placed 10 inches from the flash tube light source and subjected to light radiation as in Example IV. The flash tube was switched on immediately and the panel exposed to forty flashes of intense light radiation.

After exposure to the described light radiation, the polyester coating was found to be hard with no after tack. Hardness of the film increased somewhat thereafter, indicating cure process continued after removal from the high intensity light source.

EXAMPLE VI

| | Weights gm. |
|---|---|
| Polyester prepared according to Example I | 100 |
| Styrene monomer | 40 |
| Silicone solution | 2 |
| Non-drying capric alkyd | 2 |
| 1-chloromethyl naphthalene | 1.4 |
| 2-naphthalene sulfonyl chloride | 1.4 |
| Total | 146.8 |

A polyester coating was prepared by thoroughly mixing the above ingredients. The completed polyester coating was flow coated on a wooden panel primed with an active ground coat as in Example IV. The coated panel was heat treated for five minutes in an oven at 212° F. Exposure to light radiation immediately followed heat treatment and consisted of 40 flashes at a distance of 10 inches from the flash tube described in Example IV.

The resulting cured polyester film was fairly hard and had no after tack. Additional hardening of the film was obtained on ageing.

EXAMPLE VII

| | Weights gm. |
|---|---|
| Polyester prepared according to Example I | 100 |
| Styrene monomer | 39 |
| 1-chloromethyl naphthalene | 1.4 |
| 2-naphthalene sulfonyl chloride | 1.4 |
| Non-drying capric acid alkyd | 2 |
| 1% solution GeSF 1023 silicone in styrene | 2 |
| Total | 145.8 |

A polyester coating consisting of a mixture of the above ingredients was coated onto a wooden panel primed with an active ground coat as in Example V. This panel was placed in the photolysis unit shown in FIG. 1 (Unit No. 2) at a distance of 17 inches from the flash tubes. The infrared lamps were turned on and adjusted by means of the variable transformer to obtain a temperature of about 200° F. at the surface of the panel. After five minutes the flash tubes were switched on and allowed to flash for five minutes, yielding 300 flashes or 0.39 second of total light exposure at 1000 v. and 1125 mfd. input. Thereafter both infrared and light radiation was discontinued.

The resulting polyester film was hard, tack-free and resistant to abrasion.

In contrast to the above, a second wooden panel prepared and coated in the same manner as before and treated only with infrared radiation for 8 minutes at approximately 200° F. did not show any apparent curing of the polyester coating.

EXAMPLE VIII

| | Weights gm. |
|---|---|
| Polyester prepared according to Example I | 100 |
| Styrene monomer | 36.5 |
| Non-drying capric alkyd | 2 |
| 1-chloromethyl naphthalene | 1.4 |
| 2-naphthalene sulfonyl chloride | 1.4 |
| 2% solution GeSF1023 silicone in styrene | 2 |
| Total | 143.3 |

A polyester prepared according to the above formulation was flow coated onto wooden panels primed and unprimed as shown in Table III. The ambient temperature under the infrared lamps during heat treatment was approximately 130–140° F. Infrared treatment and light irradiation of the coated panels were accomplished at a distance of 4.25 inches from the lamps in the photolysis unit shown in FIG. 1. Each panel was exposed to 420 light flashes under the flash tubes operating through a capacitance of 1125 m.f.d. at an average potential of 800 volts. Total light exposure per panel was approximately 0.42 second based on a range of 0.7–1.3 milliseconds per flash.

TABLE III

| Panel No. | Primer[1] | Infrared Pre-Treatment, min. | Infrared Treatment During Light Irradiation, min. | Remarks |
|---|---|---|---|---|
| B[1] | Yes | 5 | 15 | Few air bubbles. |
| B[2] | Yes | None | None | More air bubbles than B[1]. Slight wrinkling. |
| B[3] | No | 5 | 15 | More air bubbles than B[2]. Wrinkled. |

[1] See following table:

|  | Percent |
|---|---|
| Vinylite VAGH | 15 |
| Solvent: |  |
|   Xylene | } 85 |
|   Methyl isobutyl ketone | |
| | 100 |

All of the above panels exhibited complete cures after light exposure. The cured polyester films were tack-free, hard and abrasion resistant. Infrared heating had little effect upon cure because the panels were not primed with an active ground coat. Pre-heating, however, was helpful in dispelling air bubbles present in the wet coating prior to curing by flash photolysis.

EXAMPLE IX

The resin used was diethylene-propylene maleate endomethylene tetrahydrophthalate in 46% by weight styrene with a sensitizer composed of 1% 1-chloromethyl naphthalene (CMN) and 1% 2-naphthalene sulfonyl chloride (NSC). (Two percent of a 2% solution of GeSF1023 silicone was added for flow purposes.) This composition was applied to a plywood panel previously coated with an active ground coat. The thickness of the resin coating was 6 mils. The coated panel was subjected to flashing light in Unit No. 2 at a distance from the lamps of 4–4.5 inches after 2 minutes air exposure and 5 minutes infrared preheat at 140° F. The ultraviolet flashing light exposure was for 15 minutes at 140° F., 450 flashes at 850 volts-1125 microfarads with simultaneous infrared. The coating was cured successfully by this treatment. It was tack-free, mar resistant and scratch resistant, the mar resistance and scratch resistance improving with aging. Adhesion was exceptional.

The active ground coat (primer) consisted of a 15% solution of a polyvinyl chloride resin (Vinylite VAGH) containing 6.35% peroxide (Lupersol DNF).

The primer did not materially affect acetone resistance. An air inhibited resin, propylene maleate phthalate in 46% styrene did not cure to a mar-scratch resistant finish under the conditions used in Example IX.

EXAMPLE X

The procedure was the same as in Example IX except that the resin used was diethylene maleate endomethylene tetrahydrophthalate in 36% styrene and the film thickness was 3 mils. The film cured very satisfactorily and the cured film was very tough and flexible.

In the foregoing examples the quantities are given in parts by weight unless otherwise indicated. Other nonair inhibited polyester resins were tested and found to be effective for the purpose of the invention. Among these were the following: diallyl pentaerythritol diethylene fumarate azelate with 25% styrene monomer; trimethylolpropane diallylether diethylene fumarate azelate with 25% (weight basis) styrene monomer; trimethylolpropane diallylether diethylene fumarate azelate with 25% (weight basis) styrene monomer; trimethylol propane diallylether diethylene fumarate phthalate with 25% (weight basis) styrene monomer; allyl glycidyl ether diethylene fumarate azelate with 25% styrene monomer. These compositions were also made up with 2% of a 2% solution of silicone (SF1023) in styrene and 1% CMC and 1% NSC. Coatings from 4 to 10 mils in thickness were treated 15 minutes with simultaneous flash and infrared exposure as in Example IX. Mar and scratch resistance were excellent in all cases and adhesion was also excellent. Acetone resistance was quite good. The impact resistance was also generally good.

It will be recognized that many other nonair inhibited photopolymerizable polyester resins can be similarly employed for the purpose of the invention. Resins of this type have been used on various kinds of wood panelling including maple, cherry and birch. They can also be applied to metal and other types of substrate.

The invention is hereby claimed as follows:

1. A method of coating a substrate with a cured polyester film which comprises depositing a liquid film of a nonair inhibited photopolymerizable polyester on said substrate to be coated in sufficient amount to form a coating of 0.002 to 0.012 inch thickness after drying, and subjecting said film to light waves in flashes while said film is exposed to air, said light waves having wave lengths within the range of 1850 to 4000 angstroms and the total output energy level being at least 30,000 watt seconds and effective to cure said coating to a mar-resistant finish, said nonair inhibited photopolymerizable polyester being from the group consisting of allyl ether resins, benzyl ether resins, tetrahydrophthalic anhydride resins, andomethylene tetrahydrophthalic anhydride resins, cyclopentadiene resins, and acetal resins.

2. The method according to claim 1 wherein the source of said flashes of light is an inert gas-filled quartz electronic flash tube and the minimum total input energy level is at least 50,000 watt seconds.

3. The method according to claim 2 wherein the inert gas filled quartz electronic flash tube contains xenon.

4. A method according to claim 1 wherein the substrate is metal.

5. A method according to claim 1 wherein the substrate is wood.

6. A method according to claim 1 wherein the polyester resin is an allyl ether resin.

7. A method according to claim 1 wherein the polyester resin is a benzyl ether resin.

8. A method according to claim 1 wherein the polyester resin is a tetrahydrophthalic anhydride resin.

9. A method according to claim 1 wherein the polyester resin is an endomethylene tetrahydrophthalic anhydride resin.

10. A method according to claim 1 wherein the polyester resin is a cyclopentadiene resin.

11. A method according to claim 1 wherein the polyester resin is an acetal resin.

References Cited

UNITED STATES PATENTS

| 2,505,067 | 9/1950 | Sachs | 204—159.23 |
| 3,008,242 | 11/1961 | Sites et al. | 117—93.31 |
| 3,052,568 | 9/1962 | Sites et al. | 117—62 |

MURRAY KATZ, Primary Examiner

U.S. Cl. X.R.

117—72, 75, 93.31, 132, 148; 204—159.19

PO-1050
(5/69)

UNITED STATES PATENT OFFICE
CERTIFICATE OF CORRECTION

Patent No. 3,511,687     Dated May 12, 1970

Inventor(s) Alex C. Keyl et al

It is certified that error appears in the above-identified patent and that said Letters Patent are hereby corrected as shown below:

Column 4, line 8, "later" should read -- latter --.

Column 11, line 52, "Silicone solution" should read -- Silicone solution[1] --; line 58, "1% silicone" should read -- [1] 1% silicone --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents